(12) United States Patent
Dittler et al.

(10) Patent No.: US 8,919,106 B2
(45) Date of Patent: Dec. 30, 2014

(54) METHOD FOR OPERATING A MOTOR VEHICLE INTERNAL COMBUSTION ENGINE WITH AN EXHAUST PARTICLE FILTER

(75) Inventors: Achim Dittler, Stuttgart (DE); Uwe Gaertner, Remshalden (DE); Thomas Koch, Boeblingen (DE); Alexander Massner, Esslingen (DE); Kevin Sisken, Saline, MI (US); Frank Zimmermann, Stuttgart (DE)

(73) Assignee: Daimler AG, Stuttgart (DE)

( * ) Notice: Subject to any disclaimer, the term of this patent is extended or adjusted under 35 U.S.C. 154(b) by 229 days.

(21) Appl. No.: 13/605,252

(22) Filed: Sep. 6, 2012

(65) Prior Publication Data
US 2014/0060008 A1 Mar. 6, 2014

(51) Int. Cl.
*F01N 3/00* (2006.01)

(52) U.S. Cl.
USPC .............................. 60/295; 60/285; 60/273

(58) Field of Classification Search
CPC ................................................. F01N 3/0232
USPC ................... 60/295, 297, 277, 285
See application file for complete search history.

(56) References Cited

U.S. PATENT DOCUMENTS

| 6,405,528 | B1 | 6/2002 | Christen et al. |
| 6,622,480 | B2 * | 9/2003 | Tashiro et al. ................. 60/295 |
| 2004/0200198 | A1 * | 10/2004 | Inoue et al. ................. 55/282.3 |
| 2005/0166582 | A1 * | 8/2005 | Gotou ............................. 60/297 |
| 2013/0074476 | A1 * | 3/2013 | Wenninger et al. ............. 60/274 |

FOREIGN PATENT DOCUMENTS

| DE | 41 34 949 A1 | 4/1993 |
| DE | 101 54 261 A1 | 6/2002 |

\* cited by examiner

*Primary Examiner* — Thomas Denion
*Assistant Examiner* — Anthony Ayala Delgado
(74) *Attorney, Agent, or Firm* — Crowell & Moring LLP

(57) ABSTRACT

A method for operating a motor vehicle internal combustion engine with an exhaust system branch in which a wall-flow exhaust particle filter is arranged. An amount of ash and an amount of soot accumulated in the exhaust particle filter are continuously determined. An ash increase value characterizing an increase in the amount of ash is determined and if pre-set conditions are present, the operation of the internal combustion engine is changed over to a special operating mode for performing an ash detachment and transportation operation, in which operating variables of the internal combustion engine are set such that, on the exhaust entry side in the exhaust particle filter, a pre-settable minimum exhaust flow speed results at which detachment of ash attached to the channel walls of the exhaust particle filter and transportation of detached ash in the direction of the respective inlet channel end is made possible.

16 Claims, 3 Drawing Sheets

Figure 1:
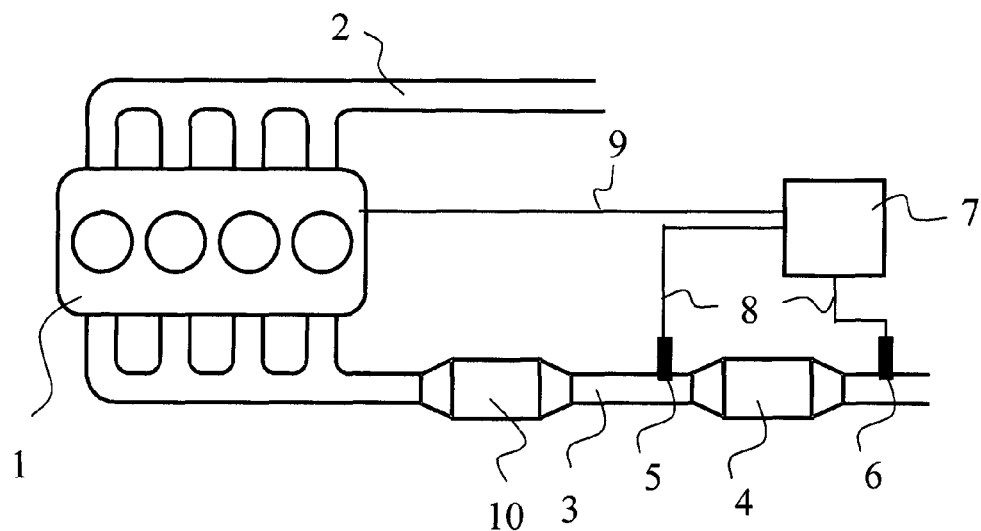

METHOD FOR OPERATING A MOTOR VEHICLE INTERNAL COMBUSTION ENGINE WITH AN EXHAUST PARTICLE FILTER

BACKGROUND AND SUMMARY OF THE INVENTION

Exemplary embodiments of the present invention relate to a method for operating a motor vehicle internal combustion engine with an exhaust particle filter.

Exhaust particle filters are used for filtering out particles contained in the exhaust, in particular in vehicles with a diesel engine. These filters are usually designed as wall-flow filters with parallel inlet and outlet channels that are closed alternately at opposing ends and channels separated from each other by porous channel walls.

Soot particles filtered out of the exhaust gradually accumulate in the exhaust particle filter, which results in a gradual increase in the flow resistance of the exhaust particle filter. Associated with this is an increase in the exhaust back-pressure caused by the exhaust particle filter, which in turn results in impairment of the engine operation. The soot loading of the exhaust particle filter can be reduced again and the flow behavior be improved by oxidation of the soot particles, for example by burning-off with oxygen present in the exhaust.

Since the ash consists of non-combustible inorganic substances, accumulation of ash that cannot be removed in the soot oxidation operations also contributes to the exhaust particle filter loading. German Patent document DE 101 54 261 A1 describes a method that makes it possible to distinguish between the ash accumulated in the exhaust particle filter and the loading caused by the soot particles accumulated in the exhaust particle filter by determining the pressure drop over the exhaust particle filter. This method makes it possible to determine the success of a soot burn-off operation. A gradual increase in the flow resistance due to the increasing ash loading cannot, however, be prevented by the method, and ultimately leads to the exhaust particle filter becoming unusable.

Since it is generally assumed that the ash loading of the exhaust particle filter cannot be reduced during operation of the vehicle, and in particular by conventional soot oxidation operations, German Patent document DE 41 34 949 A1 discloses removal of the ash accumulated in the exhaust particle filter by blowing out opposed to the normal direction of flow of the exhaust while the vehicle is being serviced. Thus, a flow resistance that is impermissibly increased due to the ash loading is reversed and the exhaust particle filter is available for further use. The method is, however, relatively costly and requires interruption of the driving operation.

Exemplary embodiments of the present invention reduce an increase in the exhaust back-pressure of an exhaust particle filter caused by storage of ash.

In the method according to the invention, an amount of ash accumulated in the exhaust particle filter and an amount of soot accumulated in the exhaust particle filter is continuously determined. In such case, an ash increase value that characterizes an increase in the amount of ash is determined for the amount of ash. This ash increase value represents the increase in the accumulated amount of ash that has taken place within a pre-set or pre-settable time interval. If pre-set conditions for the operation of the internal combustion engine are present, this operation is changed over to a special operating mode for performing an ash detachment and transportation operation, in which operating variables of the internal combustion engine are set such that on the exhaust entry side in the exhaust particle filter a pre-settable minimum exhaust flow speed results at which detachment of ash attached to the channel walls of the exhaust particle filter and transportation of detached ash in the direction of the respective inlet channel end is made possible. In such case, the pre-set conditions for changing over the internal combustion engine operation comprise dropping below a pre-settable soot amount limit value for the amount of soot and exceeding a pre-settable ash increase limit value for the ash increase value. The ash increase value is reset with termination of the special operating mode.

The invention is based on the surprising discovery that the flow resistance caused by ash accumulation is reduced if the ash particles are accumulated substantially at the end of a respective inlet channel of the exhaust particle filter. On the other hand, the flow resistance is comparatively great if the ash particles are accumulated on the channel walls of the exhaust particle filter distributed substantially across the length of the channel. Therefore, the increase in the flow resistance brought about over the course of the operating time by ash accumulation can be reduced if ash attached to the channel walls is detached and transported to the end of the channel by virtue of the ash detachment and transportation operations according to the invention. It was furthermore recognized by the inventors that the detachment of ash attached to the channel walls is facilitated if the soot loading, i.e., the amount of soot accumulated in the exhaust particle filter, is comparatively low, in particular if it falls below a pre-settable amount of soot limit value of approximately 2 g per liter of filter volume, preferably 1 g/l.

Further, it was recognized by the inventors that the detachment of ash attached to the channel walls is facilitated if the amount of ash attached to the channel walls has not already grown too greatly, i.e., the ash increase value does not exceed a limit value of 5 g/l, preferably 3 g/l and particularly preferably 1 g/l. If these conditions are met, by setting an increased exhaust flow speed on the entry side of the exhaust particle filter the ash accumulated over the length of the channel can be detached from the channel walls and transported in the direction of the respective end of the channel. This causes the flow resistance of the exhaust particle filter caused by the ash accumulation to be reduced, and the period of use of the exhaust particle filter to be extended. The increased exhaust flow speed is brought about, if necessary, by changing over the normal internal combustion engine operation into a special operating mode. The increased exhaust flow speed in such case is more than 10 m/s, preferably more than 15 m/s and particularly preferably more than 20 m/s at the channel entrance. Depending on the level of the adjustable exhaust flow speed, the special operating mode is maintained for a greater or lesser amount of time. With termination of the special operating mode, the determined ash increase value is reset, in particular to zero.

In order to achieve the low amount of soot required for a successful ash detachment and transportation operation, in one embodiment of the invention, upon exceeding the ash increase limit value, a soot regeneration operation is started in which the amount of soot is reduced by oxidation if the amount of soot exceeds the soot amount limit value. The soot regeneration operation can be dispensed with if the amount of soot, upon exceeding the ash increase limit value, is lower than the soot amount limit value anyway.

In such case, in a further embodiment of the invention, in a soot regeneration operation, a reduction in the amount of soot takes place substantially by oxidation with nitrogen dioxide. For this, the engine operation is changed over to an NOx-rich combustion, which can be achieved, for example, by reducing the exhaust recirculation rate and/or by measures to increase the combustion chamber temperature. Nitrogen oxides (NOx) emitted by the engine predominantly in the form of nitrogen monoxide (NO) are oxidized on an oxidation catalyst preceding the exhaust particle filter to form nitrogen dioxide ($NO_2$). $NO_2$ flowing into the exhaust particle filter oxidizes the soot particles, which consist predominantly of carbon, even at moderate temperatures from 250° C. upwards to form gaseous carbon monoxide (CO) and/or carbon dioxide ($CO_2$), which are discharged from the exhaust particle filter as gaseous substances with the exhaust, as a result of which the amount of soot reduces correspondingly. For optimum progress of the soot regeneration with $NO_2$, approximately 350° C. is set for the exhaust temperature and a mass ratio of NOx and the particle emission of approximately 50 or more. If the ash increase value exceeds the ash increase limit value, then prior to performing the ash detachment and transportation operation a soot regeneration operation by oxidation with $NO_2$ is started already upon exceeding a low soot amount limit value of approximately 0.5 g/l.

In a further embodiment of the invention, in a soot regeneration operation, a reduction in the amount of soot takes place substantially by oxidation with oxygen. In such case, higher temperatures than for a soot regeneration operation with nitrogen dioxide are necessary. Preferably, exhaust temperatures in the range between 550° C. and 700° C. are set on the entry side of the exhaust particle filter. This can be achieved by enriching the exhaust with hydrocarbons and exothermic oxidation of the hydrocarbons at the oxidation catalyst preceding the exhaust particle filter. A soot regeneration operation by oxidation with oxygen is started before carrying out the ash detachment and transportation operation preferably at amounts of soot or soot amount limit values of about 1 g/l.

In a further embodiment of the invention, in a soot regeneration operation, the amount of soot accumulated in the exhaust particle filter is reduced at least to the soot amount limit value. Preferably, the amount of soot is reduced to approximately zero in a soot regeneration operation directly preceding the ash detachment and transportation operation. Preferably, the soot loading is continuously calculated by a calculation model with estimation of the soot oxidation rate during the soot regeneration operation as well.

In a further embodiment of the invention, changing over of the internal combustion engine operation to the special operating mode takes place within a short time interval including the termination of the soot regeneration operation. This prevents a loosening, brought about by the soot removal, of a composite of deposited ash particles from being reversed again by renewed introduction of soot. It is particularly preferred if the special operating mode is started shortly before termination of the soot regeneration operation, if approximately 90% of the total soot to be removed has been oxidized and removed. However, provision may also be made to switch into the special operating mode within an amount of time of up to about 5 min after termination of the soot regeneration operation.

In a further embodiment of the invention, for determining the amount of ash an introduction of ash forming substances into the exhaust which is caused by one or more of the following variables is taken into consideration:

lubricating oil consumption,
fuel consumption,
combustion air consumption and
engine wear.

In such case, an introduction of ash forming substances into the exhaust particle filter takes place, as was established, predominantly due to the lubricating oil consumption. Mineral containing oil additives, such as, for example zinc or alternatively or additionally calcium, pass into the exhaust, which results in deposition of corresponding phosphates or sulfates that have to be classed with the ash. Provision may therefore be made to take into consideration exclusively the lubricating oil consumption for determining the amount of ash. It is, however, advantageous to also take into consideration one or more of the other ash sources for determining the amount of ash.

In a further embodiment of the invention, the amount of soot is determined in a computational soot loading model in which an introduction of soot into the exhaust particle filter and oxidation of soot accumulated in the exhaust particle filter is estimated and balanced, wherein at least the following are taken into consideration soot emission of the internal combustion engine,
concentration of oxygen and nitrogen dioxide in the exhaust on the entry side of the exhaust particle filter and
temperature of the exhaust particle filter. Preferably, the amount of soot both during normal operation of the internal combustion engine and in a soot regeneration operation are calculated. In such case, a separate soot burn-off model can be stored for the latter case.

Further advantages, features and details of the invention will become apparent from the following description of preferred examples of embodiment and with reference to the drawings. The features and combinations of features mentioned above in the description and the features and combinations of features mentioned below in the descriptions of the figures and/or shown in the figures alone can be used not only in the combination specified in each case, but also in other combinations or alone, without departing from the scope of the invention.

BRIEF DESCRIPTION OF THE DRAWING FIGURES

Figure 2:
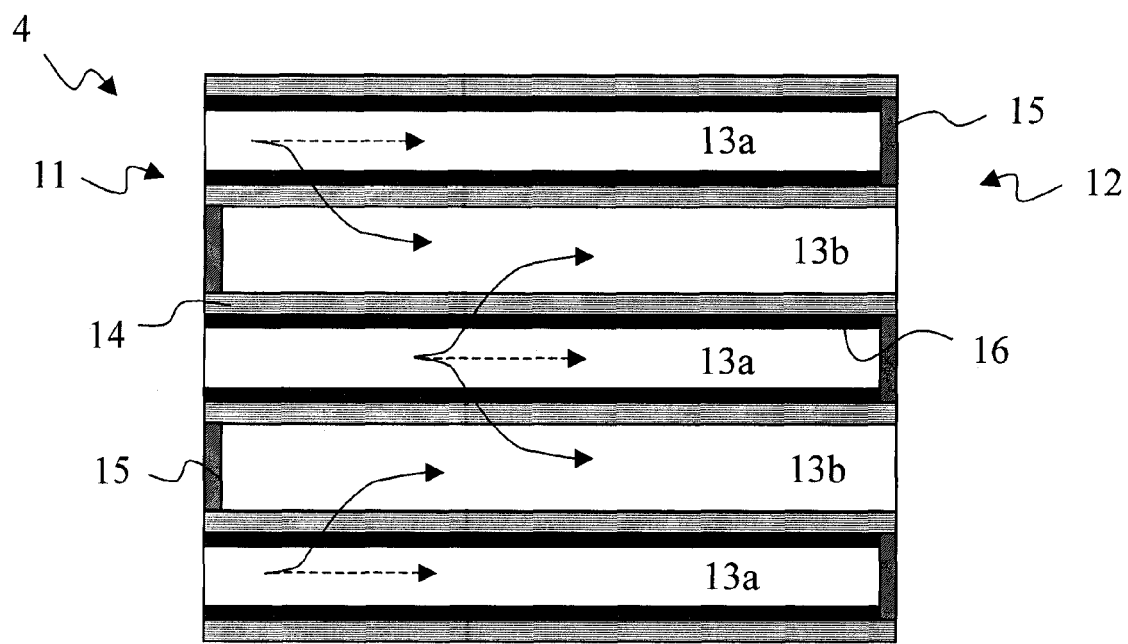
Figures 3A, 3B:
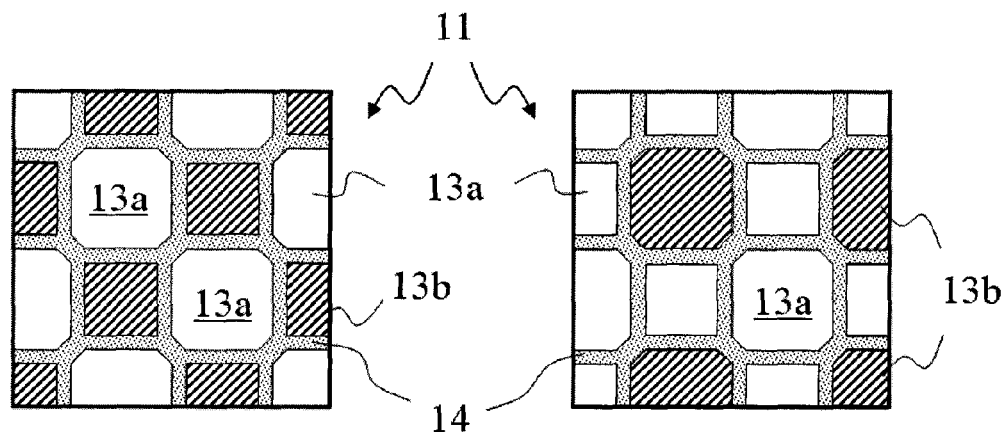
Figure 4:
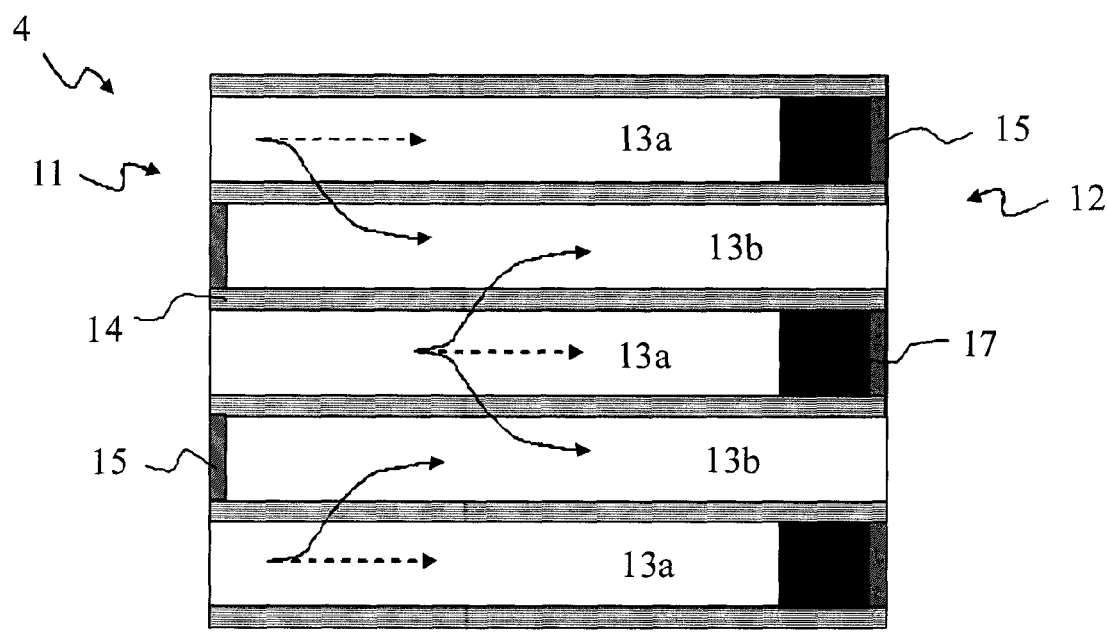
Figure 5:
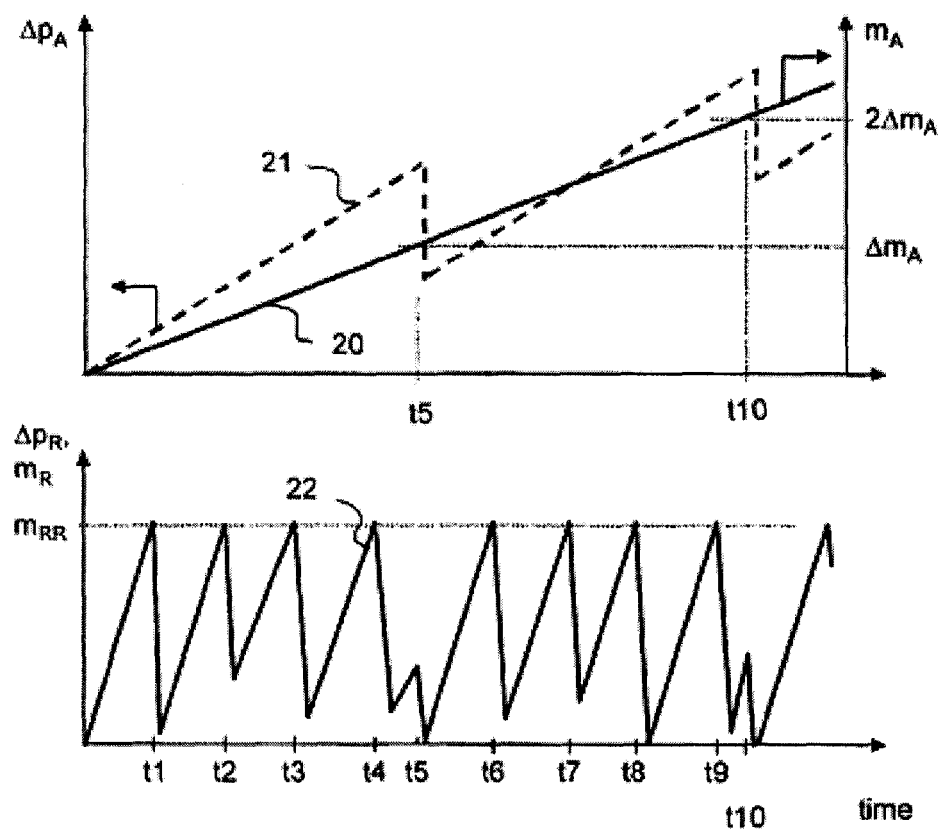

In the drawings:

FIG. 1 depicts a diagrammatic representation of an internal combustion engine with associated exhaust particle filter, FIG. 2 depicts a diagrammatic sectional representation of an exhaust particle filter in which preferably the method according to the invention is used and in which there is a uniform distribution of accumulated ash, FIGS. 3a, b depict front views of advantageous embodiments of an exhaust particle filter, FIG. 4 depicts a diagrammatic sectional representation of an exhaust particle filter according to FIG. 2, but with ash accumulated on the exit side, and FIG. 5 depicts graphs clarifying the procedure and the resulting effects when carrying out the method according to the invention.

DETAILED DESCRIPTION

FIG. 1 shows an internal combustion engine 1 of a motor vehicle with an intake-air line 2 and an exhaust system branch 3. The internal combustion engine 1 is preferably designed as a direct injection diesel engine.

An oxidation catalyst 10 is arranged upstream from an exhaust particle filter 4 in the exhaust system branch 3. On the inlet side and on the outlet side of the exhaust particle filter 4, pressure sensors 5, 6 are arranged in the exhaust system branch 3, with which sensors a pressure drop over the exhaust particle filter 4 can be determined. The sensors 5, 6 are connected via signal lines 8 to an electronic control unit 7, which is connected to the internal combustion engine 1 via a preferably bidirectional control line 9 in order to control or regulate the internal combustion engine operation. The control unit 7 is further connected to further sensors and actuators, not shown here, for detecting and setting the internal combustion engine operation and the driving condition of the motor vehicle. It will be recognized that the internal combustion engine 1 may have further component parts, not shown here, such as for example an exhaust turbocharger, an exhaust recirculation means, temperature sensors for detecting the temperatures in the exhaust or in the exhaust particle filter 4 or in the oxidation catalyst 10, further catalytically active exhaust cleaning components such as for example an SCR catalyst upstream and/or downstream from the exhaust particle filter 4, and the like. In such case, the respective operating conditions can optionally be detected by means of corresponding sensors and can be transmitted to the control unit 7.

The control unit 7 is in particular capable of carrying out interventions into the internal combustion engine operation that bring about a change in the exhaust composition and heating of the exhaust. These include first and foremost changes in the injection parameters such as number of fuel injection operations per operating cycle and a change in the time and duration thereof. In this manner, the combustion temperature can be influenced, in particular increased to increase the NOx emission if required. Further, the air/fuel ratio number of the air/fuel mixture processed in the internal combustion engine 1 can be set by changing the injection quantity, for which purpose corresponding adjustment elements, not illustrated here in greater detail, are provided. Likewise, an exhaust recirculation rate can, if required, be changed or a blade position of a VTG exhaust turbocharger or a wastegate position of a wastegate turbocharger can be changed accordingly if, for example, an increase in the NOx emission is demanded for soot oxidation in the exhaust particle filter 4. The control unit 7 is thus capable of determining or setting all operation relevant operating parameters of the internal combustion engine 1 and the exhaust system. For this, in addition families of characteristic curves or characteristic curves and/or computer programs are stored in a memory of the control unit 7, from all of which operating variables that are to be set can be set in controlled or regulated manner or output variables derived from input variables can be determined.

Soot particles emitted by the internal combustion engine 1 are filtered out from the exhaust supplied thereto during the operation thereof by the exhaust particle filter 4. Depending on the operating state of the internal combustion engine, they may be oxidized to form CO and/or $CO_2$ to a greater or lesser extent with $NO_2$ formed at the oxidation catalyst, and thus be removed from the exhaust particle filter 4. In normal driving operation, however, the soot emission and deposition rate of soot particles in the exhaust particle filter 4 is often greater than the oxidation rate, which is why a gradual increase in the amount of soot accumulated in the exhaust particle filter 4 is usually produced. Accordingly, the flow resistance and the pressure drop of the exhaust particle filter 4 increase, which adversely affects the internal combustion engine operation. For this reason, from time to time soot oxidation operations are carried out in which conditions for accelerated oxidation of accumulated soot are brought about.

The necessity of a soot oxidation operation is preferably established from the pressure drop determined over the exhaust particle filter 4 by means of the sensors 5, 6, or from a value derived therefrom for the flow resistance and/or the accumulated amount of soot and/or via a soot loading of the exhaust particle filter 4 determined additionally from another loading model. In order continuously to estimate the accumulated amount of soot, a soot loading model preferably takes into consideration the existing exhaust temperatures, the $NO_2$ and $O_2$ concentration in the exhaust on the entry side of the exhaust particle filter 4, the soot mass flow, and the temperature of the exhaust particle filter 4. If the corresponding input variables cannot be determined by direct measurement, provision is made for them to be determined from characteristic curves or families of characteristic curves stored in the control unit 7, or from calculation models. In normal operation, a soot regeneration operation is initiated if it is determined that the soot loading or a variable which correlates therewith exceeds a pre-settable threshold, which typically corresponds to a soot loading value of approximately 10 g/l. This, depending on operating conditions, is the case after a distance traveled of several hundred to a few thousand kilometers. However, soot regeneration operations may also be provided at pre-set or regular distances or distances that depend on the driving conditions. The conditions set for a soot regeneration operation are preferably maintained as long as is necessary to burn off the deposited soot. This reduces the soot loading of the exhaust particle filter 4. Accordingly, its flow resistance or the pressure drop over the exhaust particle filter 4 decreases, so that proper operation of the internal combustion engine 1 is restored.

For a soot regeneration operation with accelerated oxidation of accumulated soot, conditions are set in which accumulated soot is removed from the exhaust particle filter 4 substantially by oxidation with $NO_2$ contained in the exhaust. In particular, if more rapid soot removal is desired or necessary, conditions are set in which soot oxidation takes place substantially by $O_2$ contained in the exhaust.

For soot oxidation with $NO_2$, conditions for the internal combustion engine operation are set in which an exhaust temperature of at least 250° C. and a mass ratio of NOx and particles in the exhaust (NOx/PM ratio) of at least 30 result before the exhaust particle filter 4. Exhaust temperatures of approximately 350° C. and an NOx/PM ratio of approximately 50 are preferred. Although the $NO_2$ formation at the oxidation catalyst 10 decreases with increasing temperature for thermodynamic reasons, provision may also be made, in order to accelerate the soot oxidation in particular in the medium and high load range of the internal combustion engine 1, to set a temperature of above 380° C. and up to 500° C. on the entry side of the exhaust particle filter 4. In order to achieve the aforementioned increased exhaust temperature and the increased NOx/PM ratio, pre-settable operating variables of the internal combustion engine 1, such as combustion lambda, EGR amount, pressure, amount, time and progress of fuel injections, charge-air temperature and optionally further variables, are set in particular dependent on the driving condition.

For soot oxidation with $O_2$, conditions for the internal combustion engine operation are set at which an exhaust temperature of at least 200° C. to about 500° C. results before the oxidation catalyst 10. Additionally, the exhaust before the oxidation catalyst 10 is enriched with combustible constituents such as CO, HC, $H_2$, partially burnt and/or unburnt fuel. For this, late subsequent injection of fuel into one or more combustion chambers of the internal combustion engine 1 can be carried out. Additionally or alternatively, fuel can be injected into the exhaust system branch 3 by means of a metering device (not shown). The combustible constituents contained in the exhaust are oxidized in the oxidation catalyst 10, which raises the exhaust temperature on the entry side of the exhaust particle filter 4 to at least 550° C., preferably to up to about 700° C. This permits soot burn-off by oxygen which is continues to be present in excess in the exhaust.

The internal combustion engine operating variables which are adjusted for a soot regeneration operation are reset to their normal, in particular optimum-consumption, values again if the amount of soot is reduced to a pre-settable or pre-set minimum value of 2 g/l, preferably 1 g/l and particularly preferably 0.5 g/l. In order to establish this, the soot loading model is allowed to run during a soot regeneration operation too. In such case, options may additionally be provided in the model that take into consideration in a soot oxidation or soot burn-off module the accelerated soot oxidation taking place. Usually less than 60 minutes, in particular less than 30 minutes, is required for a soot regeneration operation with soot oxidation by $O_2$. A soot regeneration operation with soot oxidation by $NO_2$ may also take a longer time.

During operation of the internal combustion engine 1, in addition to soot particles also other, non-combustible particles are accumulated in the exhaust particle filter 4, which particles can no longer be removed by a soot burn-off operation. These particles form a residue generally referred to as "ash" in the exhaust particle filter 4. As has been established, sources of the ash particles contained in the exhaust are mainly constituents of lubricating oil additives and fuel additives, but also the ejection of small particles of metallic nature caused by abrasion or engine wear. Zinc (Zn), calcium (Ca), magnesium (Mg) and iron (Fe) typically form the main part of the metallic ash constituents. They are present in the exhaust particle filter 4 usually in the form of phosphates and sulfates. Although present in the exhaust in a usually considerably smaller proportion than soot, the accumulation of ash likewise results in a gradual increase in the particle filter flow resistance, which is additively overlaid on the increase caused by the soot loading, and undesirably shortens the period of use of the exhaust particle filter 4.

Investigations have shown that ash is frequently deposited more or less uniformly on the channel walls of the exhaust particle filter 4. The resulting conditions are illustrated diagrammatically in FIG. 2 using the example of a wall-flow exhaust particle filter 4 used in the present case.

The exhaust particle filter 4 illustrated diagrammatically in longitudinal section in FIG. 2 has narrow and straight flow channels 13a, 13b, which extend between an end-face entry side 11 and an opposing end-face exit side 12. In this case, only some of a large number of flow channels 13a, 13b are shown for clarity. The flow channels 13a, 13b extend parallel to each other, with adjacent flow channels being separated from one another by porous, gas permeable channel walls 14. The channel walls 14 are preferably formed of similar porosity throughout. The exhaust particle filter 4 has a cylindrical form with a square, round or oval cross section which preferably remains the same over the length. Furthermore, the exhaust particle filter 4 may also be constructed from a plurality of similar segments arranged in rows and columns corresponding to the form illustrated in FIG. 2, the segments lying against one another and preferably being connected with a ceramic adhesive.

The flow channels 13a, 13b in the present case are provided with a gas-impermeable plug 15 alternately on the entry side 11 and the exit side 12. Apart from the plug 15, they are formed, viewed over the rest of their axial extent, so that a flow can pass freely therethrough. Open flow channels that are non-closed on the entry side 11 form inlet channels 13a, and open flow channels which are non-closed on the exit side 12 form outlet channels 13b. Due to the closure of the inlet channels 13a on the exit side by a plug 15 in each case, exhaust entering the entry channels 13a flows through the porous channel walls 14, this being illustrated by flow arrows. In so doing, particles contained in the exhaust are filtered out.

Typically, the flow channels 13a, 13b are square in cross section and are present in each case in the same number, with—apart from an edge region—a respective inlet channel 13a being surrounded by outlet channels 14, and vice versa. This, in a top view of the entry side 11 or the exit side 12, yields a chessboard-like image of cells, the cell density preferably being between 100 cpsi (cells per square inch) and 400 cpsi. In particular, with regard to the flow resistance that forms and the uptake capacity for filtered-out particles, however, embodiments in which the entry channels 13a at least in part have a larger cross-sectional surface than the exit channels, and/or the exhaust particle filter 4 has more inlet channels 13a than outlet channels 13b are advantageous. In particularly advantageous embodiments, the entire free entry surface of the inlet channels 13a is approximately 1.25 to 3 times as large as the entire free exit surface of the outlet channels 13b, or the number of the inlet channels 13a is approximately 1.5 to 4 times as large as the number of outlet channels 13b. In this case, generally cross-sectional channel forms that deviate from the square form may be provided for the inlet channels 13a and/or the outlet channels 13b. By way of example, advantageous embodiments are illustrated diagrammatically in a view of the entry side 11 in FIGS. 3a and 3b.

In the case shown in FIG. 3a, the exhaust particle filter 4 has inlet channels 13a shown in white, which unlike the square outlet channels 13b, which are shown striped, are shaped octagonally, similarly to a square with flattened off corners. The inlet channels 13a additionally have an entry surface that is larger than the outlet channels 13b by a factor of approximately 1.9. Approximately the same number of inlet channels 13a as outlet channels 13b are provided. In the case shown in FIG. 3b, the geometric channel pattern is formed as in the example of FIG. 3a, but the corresponding exhaust particle filter 4, by virtue of a different type of arrangement of plugs 15, has approximately 3 times more inlet channels 13a than outlet channels 13b. This means that the free entry surface of the inlet channels is approximately twice as large as the free exit surface of the outlet channels.

Of course, mixed forms and modifications of the advantageous embodiments of wall-flow exhaust particle filters 4 that are illustrated merely by way of example in FIGS. 3a and 3b are possible. In any case, in particular in conjunction with the method described in greater detail further below, an extremely advantageous increase in the service life of exhaust particle filters is made possible, which is associated with an exhaust back-pressure that is low for a long time and is caused by introduction of ash. This makes reduction of particles attractive if only an inferior oil or fuel quality with a high proportion of ash forming substances is available.

Independently of channel form or channel arrangement, the channel walls 14 of the inlet channels 13a and/or of the outlet channels 13b may be provided with a catalytically active coating, which is not shown separately in the figures. The catalytic coating in this case is preferably continuously present on the channel walls 14 of the corresponding flow channels 13a, 13b, and is itself gas permeable. The catalytic coating may be formed in the manner of a three way catalyst coating, an oxidation catalytically active coating, an SCR catalyst coating which is selectively active with respect to nitrogen oxide reduction or in the manner of a nitrogen oxide storage catalyst coating in its respective conventional meaning and form familiar to the person skilled in the art. In such case, also radial layering of different coating forms may be advantageous, which makes a combined action possible. For example, a nitrogen oxide storage catalyst coating may be applied to an SCR catalyst coating, or conversely an SCR catalyst coating to a nitrogen oxide storage catalyst coating. Also possible is a coating that is formed differently in sections in the axial direction. In this manner, an exhaust cleaning component with a combined catalytic and filter-active function is formed. Such an exhaust particle filter 4 is preferably constructed from cordierite or titanate ceramic, or from silicon carbide.

Without limitation to the general case, below reference is again made to an exhaust particle filter corresponding to FIG. 2. In the case illustrated in FIG. 2, an ash layer marked with the reference numeral 16 is present on the channel walls 14 of the inlet channels 13a, which layer in the present case is shown in idealized form as a uniform, homogeneous layer. Typically, the ash in this case is embedded in deposited soot, which is not shown separately. As has been established, such an ash accumulation that is present more or less uniformly distributed over the length of an inlet channel 13a on the channel walls 14 thereof is typical. As was established in corresponding investigations, such a form of the ash distribution however proves disadvantageous with regard to back-pressure behavior or flow resistance of the exhaust particle filter 4 since passage of gas through the channel wall 14 is hampered over the entire inlet channel 13a.

If, as proposed by the inventors and explained in greater detail further below, enrichment of ash accumulated in the exhaust particle filter 4 is enforced at the exit-side end 12 of the exhaust particle filter 4, a larger channel wall surface is available for exhaust filtering without being hampered by accumulated ash, and the back-pressure behavior of the exhaust particle filter 4 is improved.

Such an advantageous form of the ash accumulation, also referred to as plug ash, is illustrated diagrammatically in FIG. 4. In this case FIG. 4, except for the different type of ash accumulation, corresponds to the illustration shown in FIG. 2. The ash accumulation which is arranged as plug ash on a respective plug 15 in this case is designated with the reference numeral 17 in FIG. 4.

Investigations by the inventors have shown that such a form of the ash accumulation actually offers advantages with regard to back-pressure behavior or flow resistance of the exhaust particle filter 4 compared with a homogeneous distribution of the same amount of ash. With an accumulation of ash appearing as plug ash, accordingly advantageously a longer period of use of the corresponding exhaust particle filter 4 can be achieved.

In accordance with exemplary embodiments of the present invention, in order to exploit this ash detachment and transportation operations are performed from time to time in which detachment of attached ash which is typically distributed over an inlet channel 13a and the transportation thereof in the direction of a respective channel end occurs. In order to be able to successfully detach ash that is accumulated distributed over the length of an inlet channel 13a, it has proved advantageous to start a respective ash detachment and transportation operation on one hand before the amount of ash has increased too greatly. If there is too great an accumulation of ash, the ash may be agglomerated in such a way that detachment becomes difficult or even impossible. On the other hand, it has proved advantageous to remove soot deposits that surround the ash particles and in which the latter are embedded optionally by oxidation before an ash detachment and transportation operation in order to expose the ash. In order to set a suitable time for an ash detachment and transportation operation, therefore the amount of ash and amount of soot accumulated in the exhaust particle filter 4 are determined continuously.

The amount of ash accumulated in the exhaust particle filter 4 is preferably determined from the introduction of ash forming substances into the exhaust, the sources of which substances are the fuel, the lubricating oil and the combustion air. Further, ash forming substances are preferably introduced into the exhaust which is caused by wear is taken into consideration. For the introduction of ash caused by the fuel, the fuel consumption, determined by the control unit 7 is multiplied by a factor which characterizes the ash content of the fuel and which was preferably stored in the control unit 7 beforehand. For the introduction of ash caused by the lubricating oil, the lubricating oil consumption is fixed as a percentage proportion of the fuel consumption or a value determined empirically beforehand and stored in the control unit 7 is used. This value is multiplied by a factor determined predominantly by the sulfate ash content of the lubricating oil and by a factor for what is called a recovery portion. The recovery portion takes into consideration the fact that typically merely about 65% to 85% of the ash arriving in the exhaust by virtue of the lubricating oil consumption is also actually deposited in the exhaust particle filter 4. The introduction of ash caused by wear is preferably determined in model-based manner from one or more of the input variables lubricating oil consumption, engine speed and engine torque, amount of blow-by of the positive crankcase ventilation and coolant temperature. Additionally further variables, such as temperatures of engine components and signals of a lubricating oil quality sensor can also be used. For the introduction of ash caused by the combustion air, the air consumption determined by the control unit 7 can be multiplied by a factor which characterizes the ash content of the air and which was preferably stored in the control unit 7 beforehand. Additionally or alternatively, a pressure drop over an air filter arranged in the intake-air line 2 can be used for determining the proportion of the introduction of ash originating from the combustion air. Thus, all the variables that mark the introduction of ash into the exhaust particle filter 4 are present, and the amount of ash in the exhaust particle filter 4 and an ash increase value which characterizes the continuous increase in the amount of ash can be continuously determined.

As already explained above, the determination of the amount of soot accumulated in the exhaust particle filter 4 takes place from the differential pressure determined by the sensors 5, 6 and/or a loading model.

Below, advantageous procedures for performing the ash detachment and transportation operations on the basis of the values determined for the amount of soot and the amount of ash or the ash increase value are discussed with reference to FIG. 5.

In the upper graph of FIG. 5, a trace referenced 20 identifies a continuous increase in the amount of ash $m_A$ accumulated in the exhaust particle filter 4 as a function of an operating time t of the internal combustion engine 1. In parallel with the increase in the amount of ash $m_A$, a differential pressure portion or pressure drop portion $\Delta P_A$ over the exhaust particle filter 4 caused by the accumulated ash increases, this being represented by the trace marked 21. Approximately parallel to the curve of the amount of ash $m_A$, an increase in the amount of soot $m_R$ and an approximately proportional increase in the pressure drop $\Delta p_R$ caused thereby can be observed, this being illustrated in the lower graph of FIG. 5 by the trace 22. In such case, of course other curves than the increases which are shown linearly for simplicity in the present case may also be produced.

As a result of the soot regeneration operations carried out in the present case at the times referenced t1, t2, t3, t4, t6, t7, t8 and t9 upon reaching a pre-set or pre-settable upper threshold value $m_{RR}$ for the amount of soot $m_R$, an approximately sawtooth curve is yielded for the amount of soot $m_R$, as illustrated by the trace 22 in the lower graph of FIG. 5. Although the increase in the pressure drop $\Delta p_R$ brought about as a result of the accumulation of soot is always reversed again by soot regeneration operations, the pressure drop nevertheless rises continuously, even if less steeply, due to the accumulation of ash that takes place in parallel. In order to reduce this, ash detachment and transportation operations are carried out in each case when the amount of ash has reached or exceeded an integer multiple of a pre-settable ash increase limit value $\Delta m_A$. The decisive ash increase limit value $\Delta m_A$ for triggering an ash detachment and transportation operation is less than 5 g ash per liter of filter volume, preferably less than 3 g/l and particularly preferably less than 1 g/l. This avoids an agglomeration of ash particles that would too greatly hamper detachment of ash. In the present case, this is the case at the times t5 and t10, and in each case it is required to carry out an ash detachment and transportation operation. If, at the respective time, the amount of soot $m_R$ in the exhaust particle filter 4 is higher than a pre-settable amount of soot limit value of about 2 g per liter of filter volume, preferably 1 g/l and particularly preferably 0.5 g/l, before starting the ash detachment and transportation operation however a soot regeneration operation is started in which soot surrounding the ash particles is very largely removed. Thus, the start a soot regeneration operation is made dependent on the amount of ash $m_A$ deposited in the exhaust particle filter 4 or on the level of the ash increase value. With termination of this soot regeneration operation, i.e., directly before or after the termination thereof, operating conditions of the internal combustion engine 1 are set such that ash freed of soot and deposited on upstream channel wall regions of the inlet channels 13a is detached and transported in the direction of the respective inlet channel end. This means that, while the amount of ash $m_A$ remains substantially unreduced, the back-pressure $\Delta P_A$ of the exhaust particle filter 4 caused by it is reduced, as can be seen from the curve of the trace 21 in the upper graph of FIG. 5.

In order to bring about detachment of ash from the channel wall 14 and transportation of detached ash to the channel end, operating variables of the internal combustion engine 1 are set such that an increased exhaust flow speed is yielded in the respective entry channels 13b directly on the end-face entry side 11. Preferably, in a two-stage procedure initially an exhaust flow speed of more than 10 m/s, preferably more than 15 m/s and particularly preferably more than 20 m/s, is set in order to permit detachment of ash attached to a respective channel wall 14. Dependent on the level of the achievable exhaust flow speed, after a pre-settable amount of time operating conditions for a further increased exhaust flow speed of more than 20 m/s, preferably more than 25 m/s and particularly preferably of more than 30 m/s are set, in order to bring about transportation of detached ash. Depending on the level of the achievable exhaust flow speed, these conditions are maintained for a more or less long time. Typically, the conditions for ash detachment for an exhaust flow speed of between 10 m/s and 20 m/s are maintained between about 90 s and 30 s. The conditions for ash transportation for an exhaust flow speed of between 20 m/s and 30 m/s are preferably likewise maintained between about 90 s and 30 s. Preferably, the conditions are maintained for a pre-settable minimum duration even if an exhaust flow speed of more than 30 m/s occurs. It is also possible to perform the detachment of ash and the transportation thereof in one step. In such case, preferably an increased exhaust flow speed of more than 20 m/s, preferably more than 25 m/s and particularly preferably of more than 30 m/s, is set from the beginning, the conditions then being maintained for correspondingly longer. A characteristic curve may be held in the control unit 7 for the dependency of the duration of the exhaust flow speed.

In order to achieve the desired increased exhaust flow speed at the entry-side end of the inlet channels 13a, changes relating to the supply of combustion air and/or the fuel injection may be performed. Preferably, a selection is made dependent on the driving condition as to which and to what extent one or more of the following changes is/are made on the air side:

closing of an EGR valve closing of an exhaust turbocharger wastegate closing of a blade position of a VTG exhaust turbocharger opening of an optionally present air vane in the intake-air line 2 and/or the exhaust system branch 3.

With regard to the fuel injection, a selection is preferably made dependent on the driving condition as to which and to what extent one or more of the following changes is/are made:

retardation of the main fuel injection reduction of the injection pressure carrying out additional injection operations following the main fuel injection.

Additionally, further measures, such as selection of a lower drive position, bypassing a charge-air cooler, can be taken. Once the amount of time provided for carrying out the ash detachment and transportation operation has elapsed, the operation of the internal combustion engine 1 is reset to normal operation, in particular to optimum-consumption operation.

If an ash detachment and transportation operation was successfully carried out, i.e., if the increased exhaust flow speed was maintained for the intended duration, with termination of the ash detachment and transportation operation the ash increase value is set back to zero again. If the desired conditions were not completely maintained, a reduction in the ash increase value can also be provided. The increase in the amount of ash that continues to take place thereupon results in renewed incrementation of the ash increase value that has thus been reset. If the ash increase limit value is reached or exceeded again, a repeat ash detachment and transportation operation is triggered. Since the amount of soot, the amount of ash, and also the operating conditions of the internal combustion engine are detected and thus are known, it can also be established whether and optionally for how long conditions that correspond to those of an ash detachment and transportation operation that is deliberately brought about occur in normal driving operation. In such a case, provision can likewise be made to reset the ash increase value to zero or a correspondingly reduced value. As can be seen from the curve of the trace 21 in the graph of FIG. 5, the back-pressure portion $\Delta p_A$ brought about by the filtering out of ash from the exhaust by the exhaust particle filter 4 is reduced in any case upon each ash detachment and transportation operation. Thus overall the disadvantageous influence of the deposition of ash is reduced and the period of use of the exhaust particle filter 4 is increased accordingly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a motor vehicle internal combustion engine with an exhaust system branch in which a wall-flow exhaust particle filter with inlet and outlet channels that are alternately closed at opposing ends and are separated from each other by porous channel walls is arranged, the method comprising:
continuously determining an amount of ash and an amount of soot accumulated in the exhaust particle filter;
determining an ash increase value that characterizes an increase in the amount of ash; and
if pre-set conditions are present, changing over the operation of the internal combustion engine to a special operating mode for performing an ash detachment and transportation operation, the special operating mode comprising
setting operating variables of the internal combustion engine and operating the internal combustion engine using the set operating variables such that on the exhaust entry side in the exhaust particle filter a pre-settable minimum exhaust flow speed results causing detachment of ash attached to the channel walls of the exhaust particle filter, transporting the detached ash in the direction of the respective inlet channel end, and depositing the transported, detached ash on the respective inlet channel end, and
resetting the ash increase value with termination of the special operating mode,
wherein the pre-set conditions for changing over the internal combustion engine operation comprises dropping below a pre-settable soot amount limit value for the amount of soot and exceeding a pre-settable ash increase limit value for the ash increase value.

2. The method as claimed in claim 1, wherein upon exceeding the ash increase limit value a soot regeneration operation is started in which the amount of soot is reduced by oxidation if the amount of soot exceeds the soot amount limit value.

3. The method as claimed in claim 2, wherein in a soot regeneration operation a reduction in the amount of soot takes place by oxidation with nitrogen dioxide.

4. The method as claimed in claim 2, wherein in a soot regeneration operation a reduction in the amount of soot takes place by oxidation with oxygen.

5. The method as claimed in claim 2, wherein in a soot regeneration operation the amount of soot accumulated in the exhaust particle filter is reduced at least to the soot amount limit value.

6. The method as claimed in claim 2, wherein changing over of the internal combustion engine operation to the special operating mode takes place within a short time interval including the termination of the soot regeneration operation.

7. The method as claimed in claim 1, wherein the determination of the amount of ash an introduction of ash forming substances into the exhaust that is caused by one or more of the following variables takes into consideration:
lubricating oil consumption,
fuel consumption,
combustion air consumption, and
engine wear.

8. The method as claimed in claim 1, wherein the amount of soot is determined in a computational soot loading model in which an introduction of soot into the exhaust particle filter and oxidation of soot accumulated in the exhaust particle filter is estimated and balanced, wherein at least the following are taken into consideration:
a soot emission of the internal combustion engine,
a concentration of oxygen and nitrogen dioxide in the exhaust on the entry side of the exhaust particle filter, and
a temperature of the exhaust particle filter.

9. A method, comprising:
operating a motor vehicle internal combustion engine in a normal operating mode and providing exhaust gas from the internal combustion engine to an exhaust system branch that includes a wall-flow exhaust particle filter with inlet and outlet channels that are alternately closed at opposing ends and are separated from each other by porous channel walls;
continuously determining an amount of ash and an amount of soot accumulated in the exhaust particle filter;
determining an ash increase value that characterizes an increase in the amount of ash;
determining that pre-set conditions are present and operating the internal combustion engine in a special operating mode, the special operating mode comprising
setting operating variables of the internal combustion engine;
operating the internal combustion engine using the set operating variables to produce exhaust gas having a preset minimum exhaust flow speed on the exhaust entry side in the exhaust particle filter;
detaching, by the exhaust gas having the preset minimum exhaust flow speed, ash attached to the channel walls of the exhaust particle filter;
transporting, by the exhaust gas having the preset minimum exhaust flow speed, the detached ash in the direction of the respective inlet channel end;
depositing, by the exhaust gas having the preset minimum exhaust flow speed,
the transported, detached ash on the respective inlet channel end; and
terminating the special operating mode and resetting the ash increase value,
wherein the pre-set conditions operating the internal combustion engine in the special operating mode comprises dropping below a preset soot amount limit value for the amount of soot and exceeding a pre-settable ash increase limit value for the ash increase value.

10. The method of claim 9, wherein prior to operating the engine in the special operating mode the exhaust particle filter is regenerated to remove soot.

11. The method of claim 10, wherein the regeneration of the exhaust particle filter to remove soot is performed upon exceeding the ash increase limit value.

12. The method of claim 11, wherein the regeneration of the exhaust particle filter involves oxidation with nitrogen dioxide.

13. The method of claim 11, wherein the regeneration of the exhaust particle filter involves oxidation with oxygen.

14. The method of claim 11, wherein the regeneration of the exhaust particle filter is performed until the amount of soot accumulated in the exhaust particle filter is reduced at least to the soot amount limit value.

15. The method of claim 11, wherein the determination of the amount of ash an introduction of ash forming substances into the exhaust that is caused by one or more of the following variables takes into consideration:
lubricating oil consumption,
fuel consumption,
combustion air consumption, and
engine wear.

16. The method of claim 11, wherein the amount of soot is determined in a computational soot loading model in which an introduction of soot into the exhaust particle filter and oxidation of soot accumulated in the exhaust particle filter is estimated and balanced, wherein at least the following are taken into consideration:

a soot emission of the internal combustion engine, a concentration of oxygen and nitrogen dioxide in the exhaust on the entry side of the exhaust particle filter, and a temperature of the exhaust particle filter.

* * * * *